Feb. 10, 1931.  C. A. BROKAW  1,792,272

INSTRUMENT CONTROL MEANS

Filed Feb. 28, 1930

Inventor:
Charles A. Brokaw,
by Charles W. Tullar
His Attorney.

Patented Feb. 10, 1931

1,792,272

UNITED STATES PATENT OFFICE

CHARLES A. BROKAW, OF SCOTIA, NEW YORK, ASSIGNOR TO GENERAL ELECTRIC COMPANY, A CORPORATION OF NEW YORK

INSTRUMENT CONTROL MEANS

Application filed February 28, 1930. Serial No. 432,241.

The present invention relates to instrument control means of the type adapted to provide control handles for instrument control shafts and the like, whereby the latter may be operated manually. Means of this character are well known, particularly in connection with radio receiving apparatus, being provided thereon as control knobs or handles for the control and the tuning shafts thereof.

The object of the present invention is to provide an improved means of the above character which is particularly adapted for use on air craft radio instruments and the like to facilitate accurate manual control of the various elements to be controlled, such as the tuning elements, in the close quarters of an air craft and in the presence of vibration, and to permit very fine and accurate control of such elements by the hand under the above or other adverse conditions, even while the hand is gloved or otherwise covered as in air travel.

The invention will be better understood from the following description, when considered in connection with the accompanying drawings, and its scope will be pointed out in the appended claims.

Figure 1:
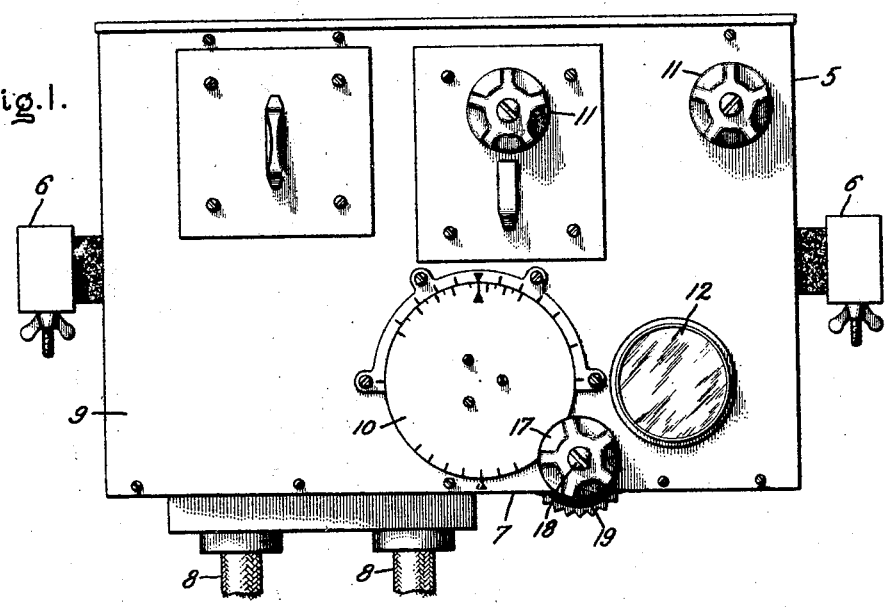
Figure 2:
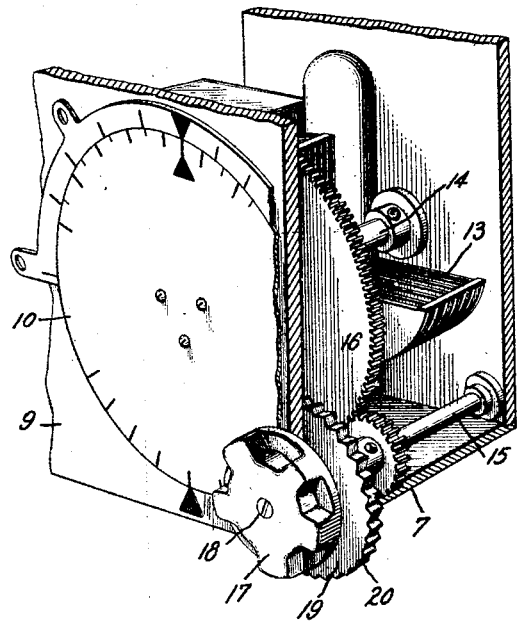
Figure 3:
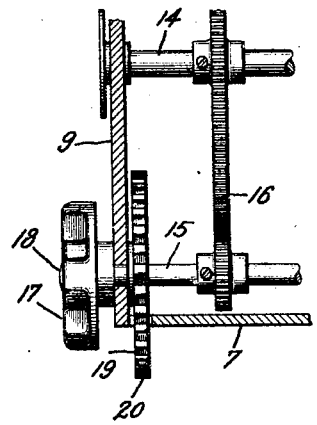

In the drawing, Fig. 1 is a front view of an instrument provided with control means embodying the invention; Fig. 2 is a view in perspective, and on a larger scale, of the instrument of Fig. 1 with the casing broken away to show certain details of the control means; and Fig. 3 is a cross-sectional view of the same and on the same scale showing further details of construction.

Referring to the drawing, 5 is an instrument casing of the type adapted to contain an aircraft receiver and since it is subject to vibration, is provided with flexible mounting supports 6 adapted to be attached to a portion of the aircraft. On one of its faces 7, which in the present example is the lower face or bottom wall of the casing, it is provided with flexible electrical cables 8 through which electrical connection is made with the apparatus within the casing. Mounted on another face 9 of the casing, which in the present example is the front panel or wall, are suitable control features represented by a dial 10 and control knobs 11 together with an indicating device 12. The dial 10 is connected with a tuning control device 13 through the medium of a shaft 14, and serves to indicate the position of the tuning control device.

The above described instrument represents any instrument having operating control means such as the dial and the tuning device requiring accurate manual adjustment or control. As is common with such devices, the drive shaft 14 is in turn driven by a suitably located control shaft 15 connected therewith through the medium of a gearing 16, the latter representing any suitable means for connecting the control shaft 11 with the driving means for the tuning device 13.

The control shaft 15 projects through the panel or wall 9 of the casing adjacent the dial and adjacent one edge of the wall or panel and is provided with a control knob 17 which is cylindrical in form and of a size adapted to be grasped and turned by the fingers of the hand of an operator. The knob is secured to the shaft by any suitable means such as a screw 18 whereby when the knob is turned the control shaft 15 is turned therewith.

Wall 7 of the casing extends at an angle, which in the present example is substantially at a right angle, to the wall or panel 9, and is adjacent the control shaft 15, as shown more clearly in Fig. 3. Walls 7 and 9 of the casing represent any two walls of an instrument casing which are adjacent and which lie in planes intersecting each other, and the control shaft 15 represents any control shaft of an instrument which extends along and adjacent one of said walls within the casing and through the other of said walls to a point outside of the casing.

Mounted on and secured to the control shaft on the opposite side of the wall 9 and within the casing is an annular control member in the form of a disc or knob 19 having a serrated peripheral surface 20 adapted to be turned by tangential movement of a body such as a gloved hand in contact with its edge. The disc 19 is arranged coaxially with the knob 17 on the control shaft 18, and is of such diameter that it projects through the plane of the wall 7 to a point beyond the edge of the panel 9 and outside of the casing, whereby a portion of its peripheral surface is exposed for operation along with the control knob 17 to turn the control shaft 15.

The control knob 17 and the control disc 19 are thus mounted in spaced relation to each other on opposite sides of a wall of the casing and upon the same shaft whereby they rotate coaxially with respect to each other. The diameter of the control knob is such that it may be turned easily to relatively rapidly rotate the control shaft while the diameter of the control disc 19 is larger than that of the control knob, whereby a greater leverage is applied to the control shaft by applying a moving force to its periphery. It is also of such a diameter that it projects through the other and adjacent wall of the casing into a position wherein it may be included in the grasp of the hand of an operator at the same time with the control knob 17.

With this arrangement, a control is provided through the medium of a smaller diameter knob on one face of the apparatus casing and a large diameter disc having milled or serrated periphery projecting through another face or wall of the casing, both the knob and the disc being mounted upon the same control shaft of the instrument. The control shaft is in turn connected in any suitable manner, preferably through a speed reduction means with the driving means for the device to be controlled.

The small knob may be turned in the usual manner to control the device 9 or tuning means through the medium of the control shaft 15, or the larger diameter disc may be turned by engaging it with the hand and moving the same tangentially of the disc. This is particularly useful in airplane receivers since it permits the operator to tune the apparatus by bringing the gloved hand against the periphery of the disc and moving it to control the tuner.

A further advantage of this control arrangement lies in the fact that it provides a frontally projecting knob of a smaller diameter than the edgewise projecting disc, at the bottom of the casing in the present example. By grasping both the knob and the disc with the fingers of the same hand, a control of the tuning or other control shaft is obtained which may be varied in response between limits represented by the radius or diameter of the knob and of the disc. The operator may exert more pressure on the knob to turn the tuning control shaft with a decreased leverage represented by the radius or diameter of the knob or with an increased leverage and with an increased vernier action represented by the radius or diameter of the disc. It has been found that this double or dual control arrangement permits the receiver to be accurately tuned even though it is vibrating when the airplane in which it is installed is traveling at high speeds.

What I claim as new and desire to secure by Letters Patent of the United States, is:—

1. The combination with an instrument casing including a panel, of a control shaft projecting through the panel adjacent one edge thereof, a control knob mounted on said shaft adjacent to and on the face of the panel, a second control knob mounted on said shaft within the casing at the rear of the panel and projecting radially from the shaft to an exposed operative position beyond said edge of the panel, whereby said knobs may be operated independently or simultaneously to rotate the shaft.

2. The combination with an instrument casing including a panel, of an instrument control shaft which passes through said panel adjacent one edge of it, means for manually rotating said shaft secured thereto on one side of the panel, a second means for manually rotating the shaft secured thereto on the opposite side of the panel, said second-named means being arranged to present an annular serrated surface beyond the edge of the panel whereby it may be included in the grasp of one hand along with the first-named means.

3. The combination with an instrument casing having a control panel and a wall adjacent and at an angle to the panel, of a control shaft which passes through said panel, a control knob mounted on said shaft adjacent the panel and outside the casing, an annular control member mounted on the shaft adjacent the panel and within the casing, said member being coaxial with the shaft and having a radius such that it extends through the wall and presents a peripheral edge adjacent said knob exteriorly of the casing.

4. The combination with an instrument panel and a control shaft extending through said panel, of means for manually rotating said shaft, said means including two spaced manually rotatable member mounted on and secured to said shaft, one on each side of the panel, one of said members being adapted to be grasped and turned by the fingers and the other of said members being of a larger diameter and presenting a peripheral edge adapted to be turned by tangential movement of a body such as a gloved hand in contact with said edge.

5. The combination with an instrument casing having two adjacent exterior walls which lie in intersecting planes, of a rotatable shaft which extends within the casing substantially parallel to and adjacent one of said walls and projects at one end through the other wall externally of the casing, a knob mounted on and secured to the externally projecting end of the shaft adjacent the casing, and a second knob mounted on the shaft within the casing and adjacent the wall through which the shaft projects whereby said knobs are separated by said wall, said second knob being of a larger diameter than the first-named knob whereby it projects through the plane of the other wall and exposes a portion of its periphery adjacent the first-named knob for operation of the shaft.

6. The combination with an instrument casing having two adjacent external faces at an angle to each other, of an instrument control means including a knob arranged to rotate in a plane substantially parallel to and adjacent one face of the casing, and a disc arranged to rotate at an angle to the other face of the casing with a portion of the peripheral edge of the disc projecting through said face of the casing adjacent the other face and said knob, whereby both the periphery of the disc and the knob may at the same time be included in the grasp of one hand for simultaneous manual operation, and an instrument control shaft arranged to connect and provide a common axis of rotation for both said disc and said knob.

In witness whereof, I have hereunto set my hand this 27th day of February, 1930.

CHARLES A. BROKAW.